(12) United States Patent
Frank (10) Patent No.: US 8,739,156 B2
(45) Date of Patent: May 27, 2014

(54) METHOD FOR SECURING THE EXECUTION OF VIRTUAL MACHINES

(75) Inventor: Shahar Frank, Ramat Hasharon (IL)

(73) Assignee: Red Hat Israel, Ltd., Raanana (IL)

( * ) Notice: Subject to any disclaimer, the term of this patent is extended or adjusted under 35 U.S.C. 154(b) by 1180 days.

(21) Appl. No.: 12/178,333

(22) Filed: Jul. 23, 2008

(65) Prior Publication Data

US 2009/0031303 A1   Jan. 29, 2009

Related U.S. Application Data

(60) Provisional application No. 60/951,708, filed on Jul. 24, 2007.

(51) Int. Cl.
G06F 9/455   (2006.01)

(52) U.S. Cl.
USPC .............................. 718/1; 718/104

(58) Field of Classification Search
CPC ................................ G06F 9/455; G06F 21/00
USPC .......................................................... 718/1
See application file for complete search history.

(56) References Cited

U.S. PATENT DOCUMENTS

| | | | |
|---|---|---|---|
| 4,835,677 A | 5/1989 | Sato et al. | |
| 5,339,417 A * | 8/1994 | Connell et al. | 718/100 |
| 5,361,375 A * | 11/1994 | Ogi | 718/1 |
| 5,961,642 A | 10/1999 | Lewis | |
| 6,397,242 B1 | 5/2002 | Devine et al. | |
| 6,496,847 B1 | 12/2002 | Bugnion et al. | |
| 6,507,904 B1 | 1/2003 | Ellison et al. | |
| 6,714,997 B1 * | 3/2004 | Brice et al. | 710/8 |
| 6,961,806 B1 | 11/2005 | Agesen et al. | |
| 6,961,941 B1 | 11/2005 | Nelson et al. | |
| 7,089,377 B1 | 8/2006 | Chen | |
| 7,552,298 B2 * | 6/2009 | Bestler | 711/163 |
| 7,613,847 B2 * | 11/2009 | Kjos et al. | 710/22 |
| 7,802,250 B2 * | 9/2010 | Uhlig et al. | 718/1 |
| 7,845,009 B2 * | 11/2010 | Grobman | 726/24 |
| 7,865,893 B1 * | 1/2011 | Omelyanchuk et al. | 718/1 |
| 8,127,098 B1 * | 2/2012 | Klaiber et al. | 711/163 |
| 8,146,078 B2 * | 3/2012 | Bennett et al. | 718/1 |
| 8,407,699 B2 * | 3/2013 | Larkin et al. | 718/1 |

(Continued)

OTHER PUBLICATIONS

Qumranet, Solid ICE™, Connection Broker, Apr. 2008, 7 pages.

(Continued)

Primary Examiner — Eric Coleman
(74) Attorney, Agent, or Firm — Lowenstein Sandler LLP (57) ABSTRACT

A method for executing a privileged virtual machine (VM) in a secured environment. The method comprises mapping virtual address space of the privileged virtual machine (VM) to start at address zero of a physical memory; configuring memory address space of emulated and real peripheral devices on an interconnect bus; and blocking the privileged VM's operating system from re-configuring the memory address space of the interconnect bus.

14 Claims, 5 Drawing Sheets

(56) References Cited

U.S. PATENT DOCUMENTS

| | | | |
|---|---|---|---|
| 2005/0182913 A1* | 8/2005 | Zimmer | 711/207 |
| 2006/0021029 A1* | 1/2006 | Brickell et al. | 726/22 |
| 2006/0123416 A1* | 6/2006 | Cibrario Bertolotti et al. | 718/1 |
| 2006/0130060 A1* | 6/2006 | Anderson et al. | 718/1 |
| 2006/0136912 A1 | 6/2006 | Robinson et al. | |
| 2006/0174053 A1* | 8/2006 | Anderson et al. | 711/6 |
| 2006/0200616 A1 | 9/2006 | Maliszewski | |
| 2006/0259734 A1* | 11/2006 | Sheu et al. | 711/203 |
| 2007/0005919 A1* | 1/2007 | van Riel | 711/163 |
| 2007/0136579 A1* | 6/2007 | Levy et al. | 713/168 |
| 2008/0005297 A1* | 1/2008 | Kjos et al. | 709/223 |
| 2008/0192648 A1* | 8/2008 | Galles | 370/254 |

OTHER PUBLICATIONS

Qumranet, KVM—Kernel-based Virtualization Machine, White Paper, 2006, 5 pages.
Qumranet, Solid ICE™, Overview, Apr. 2008, 15 pages.
Qumranet, Solid ICE™, Provisioning Manager, Apr. 2008, 5 pages.
Qumranet, Solid ICE™, Virtual Desktop Server (VDS), Apr. 2008, 6 pages.

* cited by examiner

METHOD FOR SECURING THE EXECUTION OF VIRTUAL MACHINES

CROSS REFERENCE TO RELATED APPLICATIONS

This patent application claims the benefit of U.S. Provisional Application No. 60/951,708 filed on Jul. 24, 2007, the contents of which are incorporate herein by reference.

TECHNICAL FIELD

The present invention relates generally to virtual machines, and more particularly to securing of virtual machines.

BACKGROUND OF THE INVENTION

In computer science, a virtual machine (VM) is a portion of software that, when executed on appropriate hardware, creates a virtualized environment allowing the virtualization of an actual physical computer system. Each VM may function as a self-contained platform, running its own operating system (OS) and software applications (processes). Typically, a virtual machine manager (VMM) manages allocation and virtualization of computer resources and performs context switching, as may be necessary, to cycle between various VMs.

Figure 1:
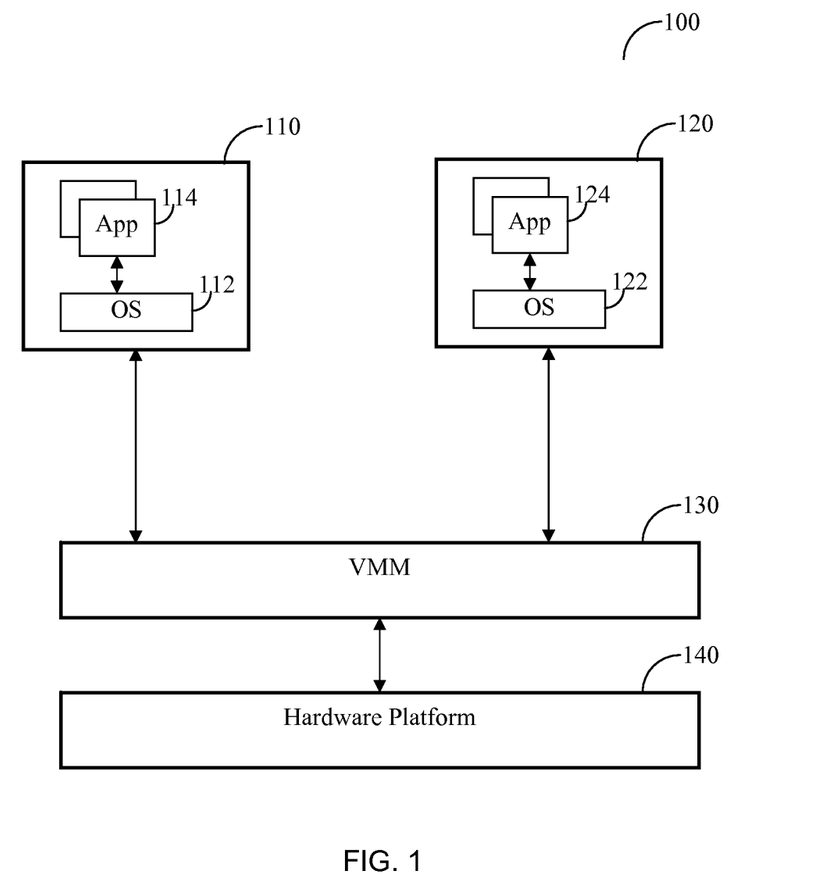
FIG. 1 is a computer system architecture including virtual machines.

As schematically shown in FIG. 1, two VMs 110 and 120 respectively run OS 112 and OS 122. The OS 112 executes applications 114 and OS 122 runs applications 124. The VMM 130 is a software application that runs directly on a hardware platform 140 and virtualizes its physical resources. These resources include a central processing unit (CPU), a system memory, a storage disk, a network interface card (NIC), a display adapter, and so on. The interface exported to the VMs 110 and 120 is as the interface of each of the hardware's 140 resources of a computer 100. In some prior art VM technologies, such as Xen the virtual machine does not simulate hardware but instead offers a special interface that requires OS modifications.

Historically, due to the complexity and processing requirements of virtualization, this technology has typically been available only on workstations, servers and/or mainframes, targeted for use by sophisticated users. However, as CPU technology advances, virtualization is currently being made available for the desktop environment (e.g., PCs with x86 processor architecture) for use by novice users. In the related art, techniques for x86 processor architecture virtualization may be found, for example, in U.S. Pat. Nos. 6,397,242, 6,496,847 and 6,961,941 that are incorporated herein by reference merely for the useful understanding of the background of the invention.

Virtualization techniques, such as those discussed in the above cited references are not executed in full privileged permissions, and therefore, the functionality and performance of applications run by the VMs is limited. For example, the VMs 110 and 120 cannot use enhanced features provided by resources of the hardware platform 140. Enabling one or more VMs to perform privileged operation may cause a security breach. As an example, a VM having privileged permissions may access to a memory space of other VMs.

It would be therefore advantageous to provide a method that allows the execution of a VM with privileged permissions in a secured environment.

SUMMARY OF THE INVENTION

To overcome the disadvantages of prior art virtualization techniques a method is provided for executing a virtual machine having privileged permissions in a secured environment. The method further allows sharing of real and emulated peripheral component interconnect (PCI) devices between multiple virtual machines wherein at least one of the virtual machines is a privileged virtual machine.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION OF THE INVENTION

Figure 2:
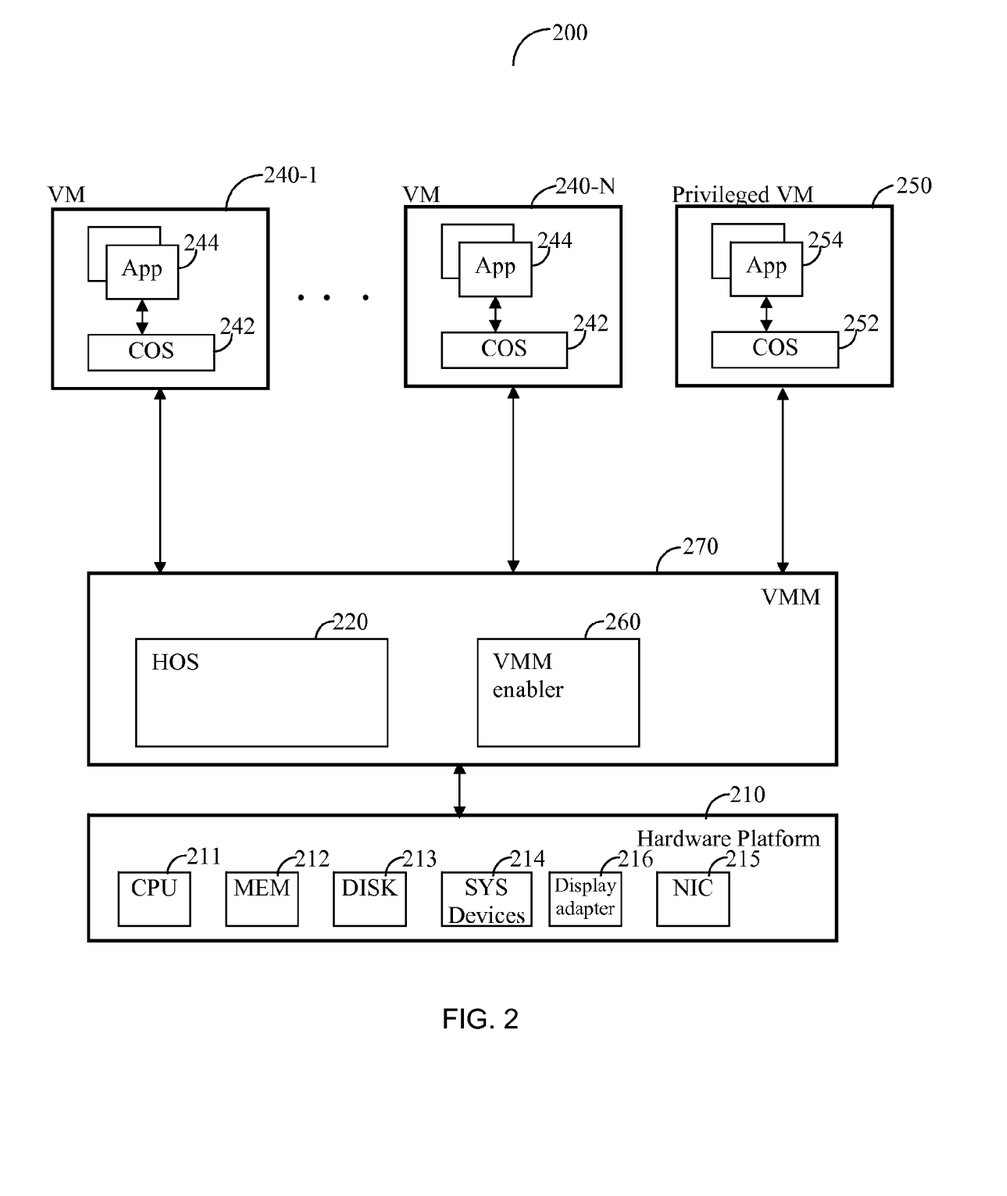
FIG. 2 is a computer system architecture used for describing the principles of the invention.

FIG. 2 shows an exemplary diagram of hardware and software components of a computer system 200 used for describing the principles of the invention. The computer 200 comprises a hardware platform 210 that includes at least one CPU 211, a system memory 212, a storage disk 213, system devices 214 (such as a system board, a system timer, a memory management unit, registers, I/O ports, and so on), a network interface card (NIC) 215, a display adapter 216, and so on.

At the system level of the computer 200 a host operating system (HOS) 220 is installed. The HOS 220 has direct access to the hardware resource of the hardware platform 210 usually using drivers installed within the HOS 220. The HOS 220 operates at the most privileged level of the CPU 211. The HOS 220 may be any type of common operating system including, but not limited to, Windows® XP, Windows Vista™, Solaris™, Free BSD, Windows server, Linux™, OpenBSD, NetBSD, a UNIX-like operating system, and the likes.

A plurality of virtual machines (VMs) 240-1 through 240-N are installed on the computer 200. Each VM 240 includes its own common operation system (COS) 242, the COS 242 being capable of executing one or more applications 244. That is, the HOS 220 acts as an interface between the hardware platform 210 and the VMs 240. The COS 242 may be any type of operating system including, but not limited to, Windows XP®, Vista®, Solaris®, Free BSD, Windows® server, Linux®, OpenBSD, NetBSD, a UNIX®-like operating system, and the likes.

A VMM enabler 260 is loaded to the HOS 220, thereby transforming the HOS into a VMM 270 that enables the VMs 240 to function normally. The VMM 270 may emulate the hardware resources for the VMs 240 to allow, for example, the communication between the resources as exported to the VMs 240 and the actual resources of the hardware platform 200. The VMM enabler 260 essentially turns the COS 242 into a process having access to hardware resources only when allowed by the VMM enabler 260.

The VMM enabler 260 is a loadable software module that can be loaded to the HOS 220, for example, as a driver using a load call. Once the VMM enabler 260 is loaded the HOS 220 can act as a VMM. The VMM enabler 260 may be further a permanent piece of software that is enabled as may be necessary. The VMM enabler 260 can be further unloaded from HOS 220, thereby returning the computer 200 to a state prior to the loading of the VMM enabler 260. The VMM 270 may be, but is not limited to, Kernel-based Virtual Machine (KVM) by Qumranet, Xen Hypervisor, and the likes.

In accordance with the principles of the invention a VM 250 having privileged permissions (hereinafter the "privileged VM") runs on the VMM 270. To this end, a few techniques are disclosed disabling the privileged VM 250 to perform a security breach. Specifically, the present invention is aimed to prevent access of the privileged VM 250 to memory areas where it does not have access rights. These areas may be used by VMs 240, HOS 220 or any of the resources of the hardware platform 210 that access the memory 212 through a direct memory access (DMA) unit (not shown). The DMA unit reads and writes data from and to physical memory. A one-to-one mapping technique is utilized to ensure that the privileged VM 250 accesses only its allocated memory space.

Figure 3:
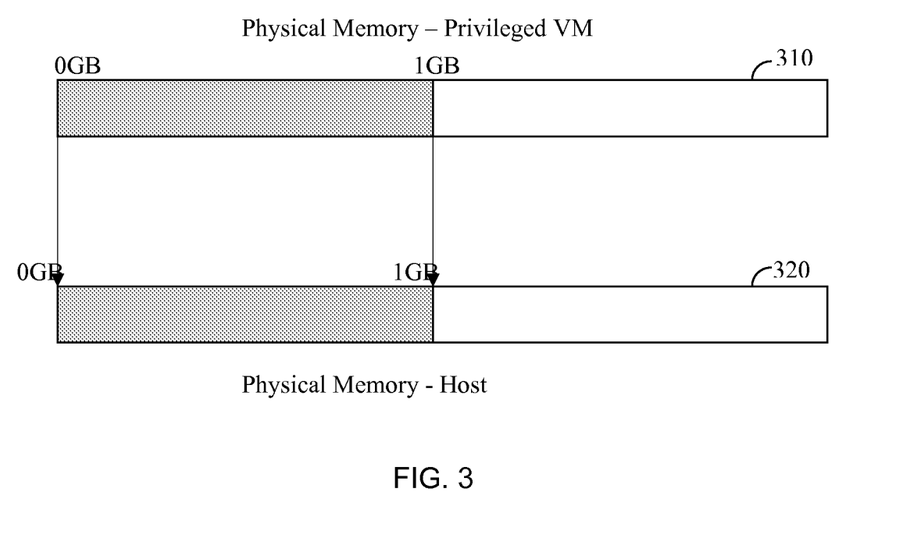
FIG. 3 is a schematic diagram describing the one-to-one mapping technique.

As illustrated in FIG. 3 the one-to-one mapping technique maps the virtual memory space, allocated to the privileged VM 250, to a location in the physical memory that starts at address zero and ends at the address that represents the size of the allocated memory. In the example shown in FIG. 3 the memory space 310 allocated to the privileged VM 250 is 1 Gigabyte (GB). The address space 320 in the physical memory that begins at address zero is allocated to the use of the HOS 220, and thus the VMM 270 captures and hides this memory space from the HOS 220.

Another security breach that can be performed by the privileged VM 250 results from sharing peripheral Component Interconnect (PCI) devices (e.g., NIC 215 and display card 216) between the VMs 240 and privileged VM 250. Specifically, the privileged VM 250 can set its PCI devices at the same address space (on the PCI bus) of PCI devices that are under the control of VMs 240. This must be prevented in order to ensure the proper execution of applications by the VMs 240 and 250.

Typically, the configuration of the PCI address space is done by the HOS 220 during initialization. However, as a COS 252 of the VM 250 has privileged permissions, it can re-configure this address space by allocating memory space to PCI devices under its control to an "already" allocated memory on the PCI bus. The present invention discloses two embodiments to resolve the PCI bus addresses conflict. In accordance, with one embodiment the VMM 270 configures the real and the emulated PCI devices during the creation of the VMs. Then, the VMM 270 instructs the COS 252 not to change the configuration of the PCI devices. In accordance with another embodiment, the VMM 270 creates an emulated PCI bus with a memory allocation required for the real and the emulated PCI devices. Then, VMM 270 instructs the COS 252 to configure all PCI devices (either under the control of VMs 240 or VM 250) on the emulated PCI bus.

Figure 4:
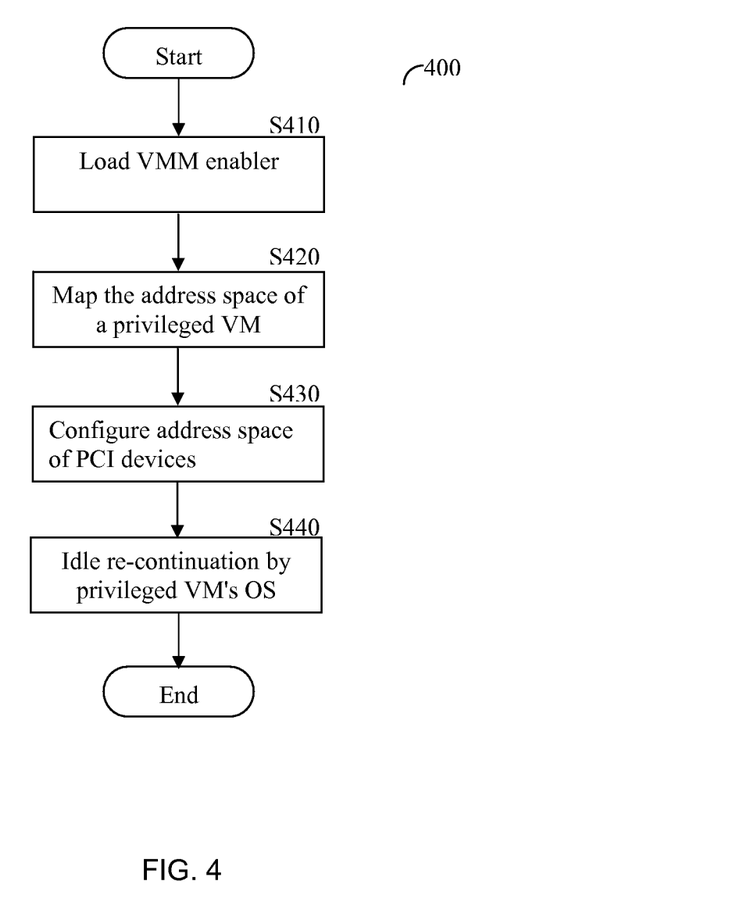
FIG. 4 is a flowchart describing the method for executing a privileged VM in a secured environment implemented in accordance with one embodiment of the invention.

FIG. 4 shows an exemplary and non-limiting flowchart 400 describing the method for executing a privileged VM in a secured environment implemented in accordance with an embodiment of the invention. The method further allows the sharing of PCI devices between multiple VMs wherein at least one of the VMs is a privileged VM. At S410, a VMM enabler is loaded to a HOS, thereby transforming the HOS to a VMM. Installation of the VMM enabler can be done by any of the conventional techniques for loading and installing software modules in software applications and does not require the initialization of the HOS. Once installed, the VMM allows the execution of a plurality of VM and/or processes over the HOS. At S420, the VMM creates the privileged VM, i.e., uploading the COS (e.g., COS 252) of the privileged VM and other files required for the execution of the VM. During the creation process of the virtual address space the privileged VM is mapped to the physical memory (e.g., memory 212) using the one-to-one mapping technique described above. The mapping is performed by the VMM. At S430, the VMM configures the memory address space of emulated and real PCI devices on a PCI bus, and thereafter at S440 instructs the privileged VM's OS not to re-configure the memory allocation of the devices.

Figure 5:
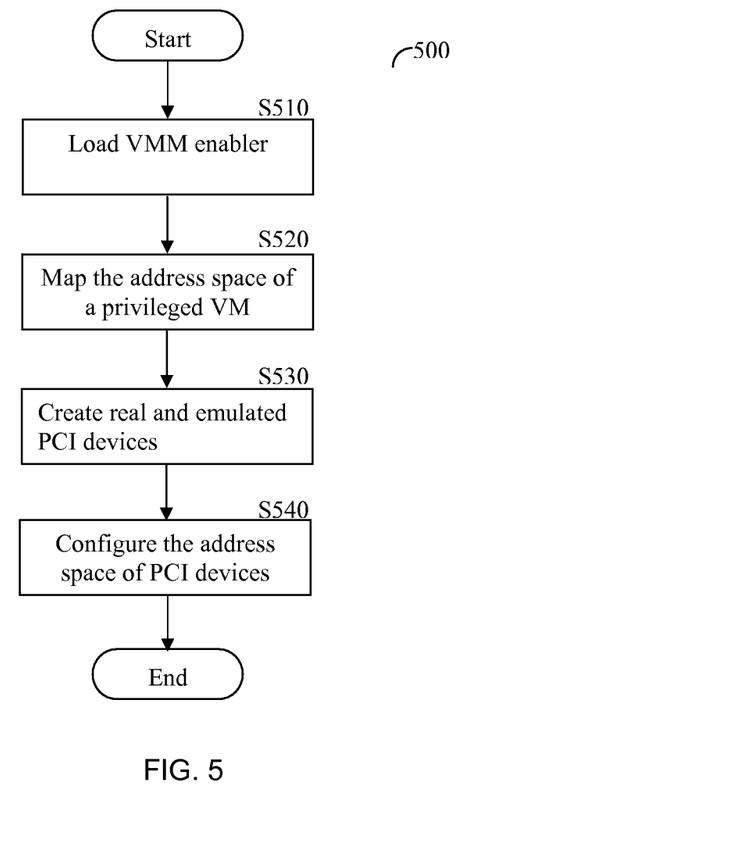
FIG. 5—is a flowchart describing the method for executing a privileged VM in a secured environment implemented in accordance with another embodiment of the invention.

FIG. 5 shows an exemplary and non-limiting flowchart 500 describing the method for executing a privileged VM in a secured environment implemented in accordance with an embodiment of the invention. The method further allows sharing of PCI devices between multiple VMs where at least one of the VMs is a privileged VM. At S510, the VMM enabler is loaded to a HOS, thereby transforming the HOS to a VMM. The installation of the VMM enabler can be done by any conventional techniques for loading and installing software modules in software applications and does not require the initialization of the HOS. Once installed, the VMM allows the execution of a plurality of VMs and/or processes over the HOS. At S520, the VMM creates the privileged VM, i.e., uploading the OS (e.g., COS 252) of the privileged VM and other files required for the execution of the VM. During the creation process the virtual address space the privileged VM is mapped to the physical memory (e.g., memory 212) using the one-to-one mapping technique described above. The mapping is performed by the VMM. At S530, the VMM creates a set of the real and the emulated PCI devices and allocates memory on the PCI bus for these devices. However, the VMM does not configure the address space of each PCI device. At S540 the VMM instructs the privileged VM's OS to configure the address spaces of each of the PCI devices in the allocated memory. This ensures sharing of PCI devices between the VMs without and memory clashes.

The present invention has now been described with reference to a specific embodiment where the PCI bus is implemented as means to interconnect peripheral devices. Other embodiments will be apparent to those of ordinary skill in the art. For example, the interconnect bus can be adapted for use with peripheral devices utilizing connection formats, such as USB3, PCI $2^{nd}$ generation, Hypertransport, Infiniband, serial and fast point-to-point interconnects, and the likes. It should be noted that the inventions disclosed hereinabove may be implemented in hardware, software, firmware or any combinations thereof.

In an embodiment of the present invention, some or all of the method components are implemented as a computer executable code. Such a computer executable code contains a plurality of computer instructions that when performed in a predefined order result with the execution of the tasks disclosed herein. Such computer executable code may be available as source code or in object code, and may be further comprised as part of, for example, a portable memory device or downloaded from the Internet, or embodied on a program storage unit or computer readable medium. The principles of the present invention may be implemented as a combination of hardware and software and because some of the constituent system components and methods depicted in the accompanying drawings may be implemented in software, the actual connections between the system components or the process function blocks may differ depending upon the manner in which the present invention is programmed.

The computer executable code may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

I claim:

1. A method for executing a privileged virtual machine (VM) in a secured environment on a host computer, comprising:
   mapping virtual address space of the privileged virtual machine (VM) to a physical memory of the host computer, the host computer comprising the privileged VM executing simultaneously with one or more non-privileged VMs on top of a virtual machine manager (VMM) of the host computer;
   configuring memory address space of emulated and real peripheral devices on an interconnect bus, wherein at least a subset of the emulated and real peripheral devices is associated with the one or more non-privileged VMs; and
   blocking a guest operating system of the privileged VM from re-configuring the memory address space of the interconnect bus to prevent the privileged VM from sharing any of the emulated and real peripheral devices with the non-privileged VMs.

2. The method of claim 1, further comprising:
   preventing a non-privileged VM from becoming the privileged VM for as long as a previously designated privileged VM is operative as the privileged VM.

3. The method of claim 1, further comprising:
   loading a virtual machine manager (VMM) enabler, wherein the VMM enabler causes an operating system of the host computer to operate as a virtual machine manager.

4. The method of claim 3, wherein the virtual machine manager creates the privileged VM.

5. The method of claim 4, wherein the virtual machine manager controls the execution of a plurality of VMs in the secured environment.

6. A host computer system, comprising:
   a memory; and
   a processor, coupled to the memory, to:
   execute a privileged virtual machine (VM) simultaneously with one or more non-privileged VMs on top of a virtual machine manager (VMM) of the host computer system;
   map virtual address space of the privileged VM to the memory;
   configure memory address space of emulated and real peripheral devices on an interconnect bus, wherein at least a subset of the emulated and real peripheral devices is associated with the one or more non-privileged VMs; and
   block a guest operating system of the privileged VM from re-configuring the memory address space of the interconnect bus to prevent the privileged VM from sharing any of the emulated and real peripheral devices with the non-privileged VMs.

7. The system of claim 6, wherein the processor is further to prevent a non-privileged VM from becoming the privileged VM for as long as a previously designated privileged VM is operative as the privileged VM.

8. A method for executing a privileged virtual machine (VM) in a secured environment on a host computer, comprising:
   mapping, by a virtual machine manager (VMM) of the host computer, virtual address space of the privileged virtual machine (VM) to start at address zero of a physical memory of the host computer, the host computer comprising the privileged VM executing simultaneously with one or more non-privileged VMs on top of the VMM;
   creating, by the VMM, a set of emulated and real peripheral devices on an interconnect bus, the set of the emulated and real peripheral devices being associated with the privileged VM and the one or more non-privileged VMs executing on the host computer; and
   instructing, by the VMM, a guest operating system of the privileged VM to configure the memory address space of the interconnect bus to allow sharing of the emulated and real peripheral devices between the privileged VM and the non-privileged VMs.

9. The method of claim 8, further comprising:
   loading a virtual machine manager (VMM) enabler, wherein the VMM enabler causes an operating system of the host computer to operate as the virtual machine manager.

10. The method of claim 9, wherein the virtual machine manager creates the privileged VM.

11. The method of claim 10, wherein the virtual machine manager controls the execution of a plurality of VMs in the secured environment.

12. A system for enabling the operation of a plurality of virtual machines (VMs) in a secured environment comprising:
- a memory;
- a processor, coupled to the memory, to execute a privileged virtual machine (VM) simultaneously with one or more non-privileged VMs on top of a virtual machine manager (VMM); and
- the VMM, executed from the memory by the processor to:
- map virtual address space of the privileged VM to start at address zero of the memory;
- create a set of emulated and real peripheral devices on an interconnect bus, the set of the emulated and real peripheral devices being associated with the privileged VM and the one or more non-privileged VMs executing on the host computer system; and
- instruct a guest operating system of the privileged VM to configure the memory address space of the interconnect bus to allow sharing of the emulated and real peripheral devices between the privileged VM and the non-privileged VMs.

13. A non-transitory computer readable medium having stored thereon computer executable code for executing a privileged virtual machine (VM) in a secured environment on a host computer, comprising:
- mapping virtual address space of the privileged virtual machine (VM) to a physical memory of the host computer, the host computer comprising the privileged VM executing simultaneously with one or more non-privileged VMs on top of a virtual machine manager (VMM) of the host computer;
- configuring memory address space of emulated and real peripheral devices on an interconnect bus, wherein at least a subset of the emulated and real peripheral devices is associated with the one or more non-privileged VMs; and
- blocking a guest operating system of the privileged VM from re-configuring the memory address space of the interconnect bus to prevent the privileged VM from sharing any of the emulated and real peripheral devices with the non-privileged VMs.

14. A non-transitory computer readable medium having stored thereon computer executable code for executing a privileged virtual machine (VM) in a secured environment on a host computer, comprising:
- mapping, by a virtual machine manager (VMM) of the host computer, virtual address space of the privileged virtual machine (VM) to start at address zero of a physical memory of the host computer, the host computer comprising the privileged VM executing simultaneously with one or more non-privileged VMs on top of a virtual machine manager (VMM);
- creating, by the VMM, a set of emulated and real peripheral devices on an interconnect bus, the set of the emulated and real peripheral devices being associated with the privileged VM and the one or more non-privileged VMs executing on the host computer; and
- instructing, by the VMM, a guest operating system of the privileged VM to configure the memory address space of the interconnect bus to allow sharing of the emulated and real peripheral devices between the privileged VM and the non-privileged VMs.

* * * * *